United States Patent
Mohseni et al.

(10) Patent No.: US 7,127,663 B2
(45) Date of Patent: Oct. 24, 2006

(54) BAD FRAME INDICATOR FOR RADIO-TELEPHONE RECEIVERS IN GSM MOBILE SYSTEMS

(75) Inventors: Mohammad J. Mohseni, San Diego, CA (US); Roland Rick, San Diego, CA (US); Faraz Faheem, San Diego, CA (US); Helena Deirdre O'Shea, San Diego, CA (US)

(73) Assignee: Qualcomm Incorporate, San Diego, CA (US)

(*) Notice: Subject to any disclaimer, the term of this patent is extended or adjusted under 35 U.S.C. 154(b) by 357 days.

(21) Appl. No.: 10/650,865

(22) Filed: Aug. 28, 2003

(65) Prior Publication Data

US 2005/0048923 A1    Mar. 3, 2005

(51) Int. Cl.
*H03M 13/00* (2006.01)
(52) U.S. Cl. ...................................... 714/780
(58) Field of Classification Search ............. 455/67.11, 455/67.13, 296, 226.2
See application file for complete search history.

(56) References Cited

U.S. PATENT DOCUMENTS

| | | | |
|---|---|---|---|
| 5,557,639 A | | 9/1996 | Heikkila et al. ............ 322/445 |
| 5,815,507 A | * | 9/1998 | Vinggaard et al. .......... 714/704 |
| 5,960,010 A | | 9/1999 | Liu et al. ................... 371/43.1 |
| 6,092,230 A | * | 7/2000 | Wood et al. ................ 714/755 |
| 6,233,708 B1 | * | 5/2001 | Hindelang et al. .......... 714/747 |
| 6,397,358 B1 | * | 5/2002 | Burton et al. ............... 714/705 |
| 6,487,185 B1 | * | 11/2002 | Burton ........................ 370/332 |
| 6,654,613 B1 | * | 11/2003 | Maeng et al. ............... 455/522 |
| 6,775,521 B1 | * | 8/2004 | Chen ........................ 455/67.11 |

OTHER PUBLICATIONS

Hindelang et al. Quality Enhancement of Coded and Corrupted Speeches in GSM Mobile Systems Using Residual Redundancy (1997) IEEE International Conference on Acoustics, Speech, and Signal Processing pp. 259-262.

* cited by examiner

*Primary Examiner*—Albert Decady
*Assistant Examiner*—Sam Rizk
(74) *Attorney, Agent, or Firm*—Philip Wadsworth; Charles D. Brown; Howard H. Seo (57) ABSTRACT

A system and method for bad frame indication of a speech frame includes estimating a signal-to-noise ratio (SNR) and checking a cyclic redundancy code (CRC) value of the speech frame. When the speech frame fails CRC error detection or the SNR is below a pre-specified value, a bad frame indication (BFI) flag is set. When the speech frame passes CRC error detection and the SNR is above the pre-specified value, a receive signal quality metric of the speech frame is checked against a high threshold and, if need be, a low threshold. The BFI flag and the receive signal quality metric for the previous speech frame is checked when the current receive signal quality metric is between the high and low thresholds. The BFI flag is set according to the value of the SNR, the CRC value, the current and previous receive signal quality metrics, and the previous BFI flag.

31 Claims, 4 Drawing Sheets

BAD FRAME INDICATOR FOR RADIO-TELEPHONE RECEIVERS IN GSM MOBILE SYSTEMS

BACKGROUND OF THE INVENTION

The present invention generally relates to wireless digital communication using voice encoding and, more particularly, to a system and method for detecting bad data frames in reception of voice transmissions.

Global System for Mobile communications (GSM) is a mobile telecommunication system with GSM networks operational in several countries around the world. The GSM system operating at 900 mega-Hertz (MHz), and its sibling systems operating at 1.8 giga-Hertz (GHz) (called DCS1800) and 1.9 GHz (called GSM1900 or PCS1900, and operating in North America), are specified according to a GSM standard published by the European Telecommunication Standards Institute (ETSI). A basic telecommunications service supported by GSM is telephony. As with other types of communications, speech is digitally encoded and transmitted through the GSM network as a digital stream.

Figure 1:
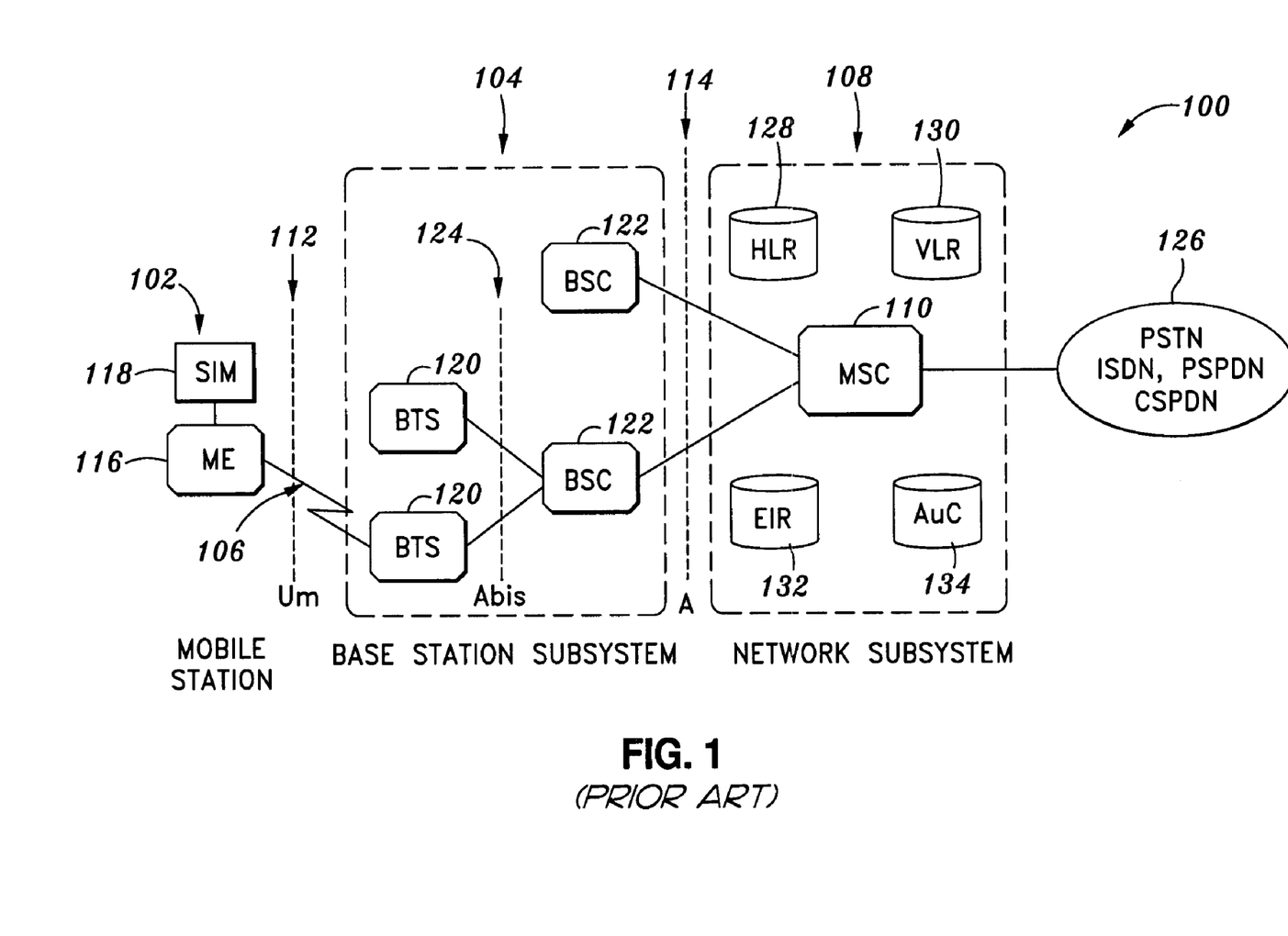
FIG. 1 is a diagram illustrating the general architecture of a prior art GSM network.

FIG. 1 shows the general architecture of a generic GSM network 100. GSM network 100 is composed of several functional entities, whose functions and interfaces are specified, for example, according to standards published by ETSI. GSM network 100 can be divided into three subsystems. The mobile station or subsystem 102 is carried by the subscriber, for example, a person using the mobile station 102 as a telephone. A base station subsystem (BSS) 104 controls a radio link 106 with the mobile station 102. A network subsystem 108, the main part of which is a mobile services switching center (MSC) 110, performs the switching of calls between mobile users—such as a person using the mobile station 102, and between mobile users and fixed network users. The MSC 110 also handles the mobility management operations. The mobile station 102 and the base station subsystem 104 communicate across a Um interface 112, also known as an air interface or radio channel 112. The base station subsystem 104 communicates with the mobile services switching center 110 across an A interface 114.

The mobile station 102 includes mobile equipment 116 (the terminal) and a smart card called the subscriber identity module (SIM) 118. The SIM 118 provides personal mobility so that the user can have access to subscribed services irrespective of a specific terminal, i.e. mobile equipment 116. By inserting the SIM 118 card into another GSM terminal (not shown), the user is able to receive calls at that terminal, make calls from that terminal, and receive other subscribed services.

The base station subsystem 104 includes two parts, a base transceiver station (BTS) 120 and a base station controller (BSC) 122. One or more base transceiver stations 120 communicate with a base station controller 122 across a standardized Abis interface 124, allowing (as in the rest of the system) operation between components made by different suppliers. The base transceiver station 120 houses the radio transceivers that define a cell and handles the radio-link protocols with the mobile stations, for example, mobile station 102. In a large urban area, there will potentially be a large number of base transceiver stations 120 deployed. A base station controller 122 manages the radio resources for one or more base transceiver stations 120. The base station controller 122 handles radio-channel setup, frequency hopping, and handovers, for example. The base station controller 122 is the connection between the mobile station 102 and the MSC 110.

The central component of network subsystem 108 is the MSC 110. The MSC 110 acts like a normal switching node of a public switched telephone network (PSTN) or an integrated services digital network (ISDN), and additionally provides functionality needed to handle a mobile subscriber, such as registration, authentication, location updating, handovers, and call routing to a roaming subscriber. These services are provided in conjunction with several functional entities, which together form the network subsystem 108. The MSC 110 provides connection to the fixed networks 126 (such as the PSTN, ISDN, packet switched public data networks (PSPDN), and circuit switched public data networks (CSPDN)). Signaling between functional entities in the network subsystem 108—such as MSC 110 and a home location register (HLR) 128—uses Signaling System Number 7 (SS7), used for trunk signaling in ISDN and widely used in current public networks. For example, the HLR 128 and a visitor location register (VLR) 130, together with MSC 110, provide the call-routing and roaming capabilities of GSM. An equipment identity register (EIR) 132 is a database that contains a list of all valid mobile equipment on the network. An authentication center (AuC) 134 is a protected database that stores a copy of the secret key stored in each subscriber's SIM 118 card, which is used for authentication and encryption over a radio channel 112.

GSM uses a combination of Time-Division Multiple Access (TDMA) and Frequency-Division Multiple Access (FDMA) to share the limited bandwidth of the radio channel 112 among multiple users, i.e., for communication between multiple mobile stations 102 and a base transceiver station 120. FDMA employed by GSM involves the division by frequency of the maximum 25 mega-Hertz (MHz) bandwidth of the radio channel 112 into 124 carrier frequencies spaced 200 kilo-Hertz (kHz) apart. One or more carrier frequencies are assigned to each base transceiver station 120. Each of these carrier frequencies is then divided in time, using a TDMA scheme such as a TDMA scheme 200 shown in FIG. 2.

Figure 2:
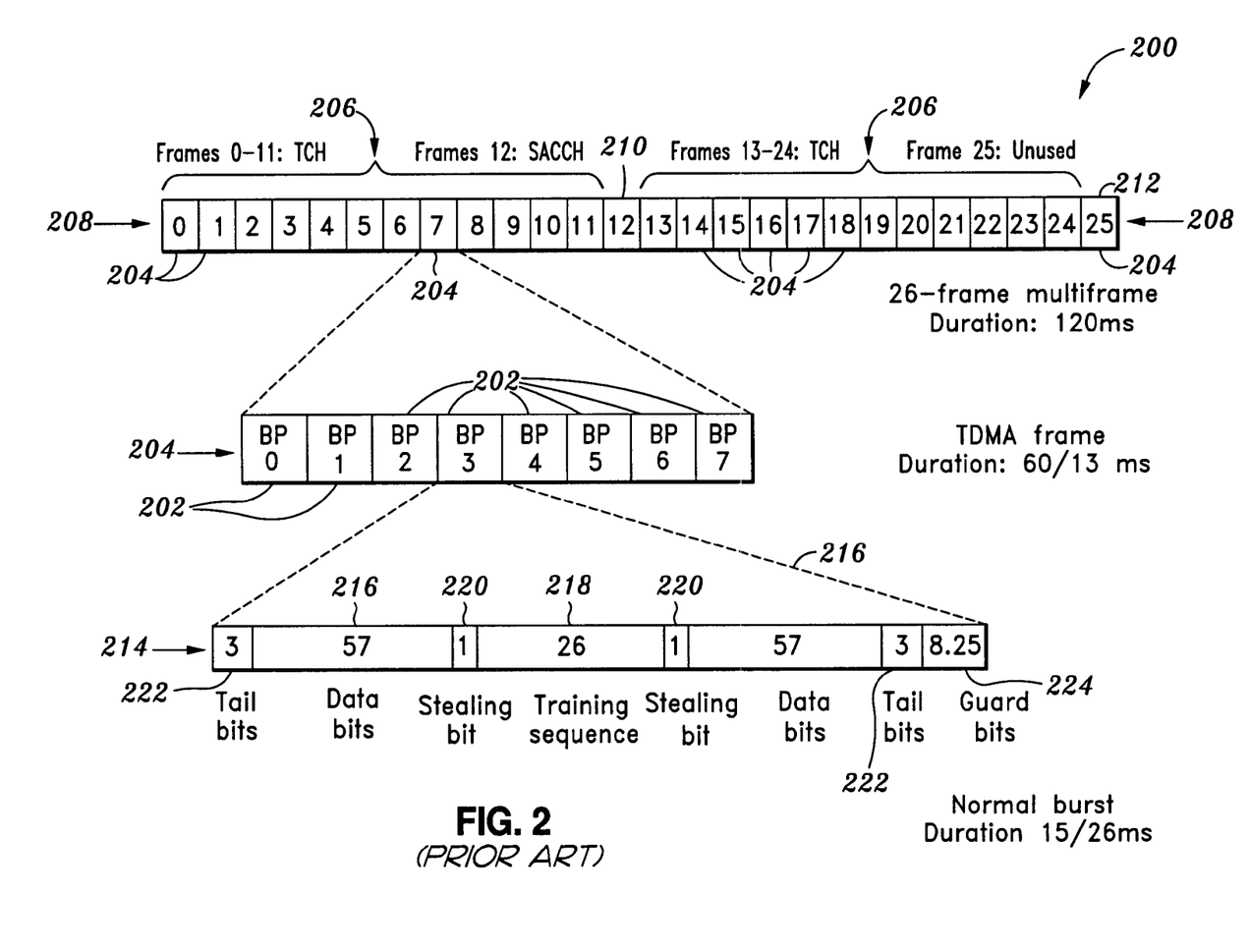
FIG. 2 is a timing diagram illustrating the structure of data frames in a prior art GSM system.

FIG. 2 illustrates the timing structure of exemplary TDMA scheme 200 used by GSM. The fundamental unit of time in the TDMA scheme 200 is called a burst period (BP)—illustrated by burst periods 202 in FIG. 2. A burst period 202 lasts $15/26$ milliseconds (ms)—or approximately 0.577 ms. Eight burst periods 202 are grouped into a TDMA frame 204 ($120/26$ ms, or approx. 4.615 ms). The TDMA frame 204 forms the basic unit for the definition of logical channels. For example, a channel may be defined as one of the burst periods 202 per TDMA frame 204. Channels are defined by the number and position of their corresponding burst periods 202.

A traffic channel (TCH) 206 is used to carry speech and data traffic. The traffic channels 206 are defined using a 26-frame multi-frame 208, which is a group of 26 TDMA frames 204. The length of a 26-frame multi-frame 208 is 120 ms, which is how the length of a burst period 202 is defined (120 ms divided by 26 TDMA frames divided by 8 burst periods per frame). Out of the 26 TDMA frames 204, twenty-four of them are used for traffic channels 206, one is used for a slow associated control channel (SACCH) 210, and one is currently an unused TDMA frame 212, as seen in FIG. 2. Traffic channels 206 for the uplink and downlink are separated in time by 3 burst periods, so that the mobile station 102 does not have to transmit and receive simultaneously, thus simplifying the electronics.

There are four different types of bursts, i.e., data occupying a burst period 202, that are used for transmission in GSM. A normal burst—such as burst 214—is used to carry data and most signaling. The normal burst 214 has a total length of 156.25 bits, made up of two 57 bit information blocks, or data bits 216, a 26 bit training sequence 218 used for equalization, one stealing bit 220 for each information block, i.e., data bits 216,—used for fast associated control channel (FACCH), three tail bits 222 at each end, and an 8.25 bit guard sequence 224, as shown in FIG. 2. The 156.25 bits of normal burst 214 are transmitted in 0.577 ms, giving a gross bit rate of 270.833 kbps.

GSM is a digital system so that speech, which is inherently analog, has to be digitized. The voice encoder/decoder (also referred to as "codec" or "vocoder") of GSM employs a digitization technique called regular pulse excited—linear predictive coder (RPE-LPC) with a long term predictor loop. Basically, information from previous speech samples, which does not change very quickly, is used to predict the current speech sample. Speech is divided into 20 millisecond samples, each of which is encoded by the vocoder as 260 bits, giving a total bit rate of 13 kbps, called Full-Rate speech coding.

Because of natural and man-made electromagnetic interference, the encoded speech or data signal transmitted over the air interface, radio channel 112, must be protected from errors. GSM uses convolutional encoding and block interleaving to achieve this protection. The algorithms used differ for speech and for data. For speech, the vocoder produces a 260 bit block, called a speech frame, for every 20 ms speech sample. Some bits of this 260 bit block, or speech frame, are more important for perceived speech quality than others. The bits are thus divided into three classes:

Class Ia—50 bits—most sensitive to bit errors;
Class Ib—132 bits—moderately sensitive to bit errors;
Class II—78 bits—least sensitive to bit errors.

Class Ia bits have a 3 bit cyclic redundancy code (CRC) added for error detection. If an error is detected, the speech frame containing the 260 bit block is judged too damaged to be comprehensible, referred to as a "bad speech frame" or "bad frame", and is discarded. The discarded speech frame is replaced by an attenuated version of the previous correctly received speech frame. The 53 Class Ia bits, together with the 132 Class Ib bits and a 4 bit tail sequence (a total of 189 bits), are input into a ½ rate convolutional encoder of constraint length 4. Each input bit is encoded as two output bits, based on a combination of the previous 4 input bits. The convolutional encoder thus outputs 378 bits, to which are added the 78 remaining Class II bits, which are unprotected. Thus every 20 ms speech sample is encoded as 456 bits, giving a bit rate of 22.8 kbps.

To further protect against the burst errors common to the air interface, radio channel 112, each speech sample is interleaved. The 456 bits output by the convolutional encoder are divided into 8 blocks of 57 bits, and these blocks are transmitted in eight consecutive time-slot bursts 214, i.e., burst periods 202. Since each time-slot burst 214 can carry two 57-bit information blocks of data bits 216, each burst 214 carries traffic from two different speech samples.

Discontinuous transmission (DTX) is a method that takes advantage of the fact that a person speaks less than 40 percent of the time in normal conversation, by turning the transmitter off during silence periods, thereby conserving power. The most important component of DTX is voice activity detection. DTX voice activity detection distinguishes between voice and noise inputs despite the presence of background noise. If a voice signal is misinterpreted as noise, the transmitter is turned off and a very annoying effect called clipping is heard at the receiving end. If, on the other hand, noise is misinterpreted as a voice signal too often, the efficiency of DTX is dramatically decreased. In addition, when the transmitter is turned off, there is total silence heard at the receiving end, due to the digital nature of GSM. To assure the receiver that the connection is not dead, comfort noise is created at the receiving end by matching the characteristics of the transmitting end's background noise.

The GSM standard published by ETSI, for example, European Standard Telecommunication Series (ESTS) 11.10 Release 1999, at section 14.1 and, in particular, at sections 14.1.1.1 and 14.1.1.2, requires a mobile station, for example, mobile station 102, to meet a certain level of performance in DTX mode with regard to bad speech frames that are passed to the vocoder. If the phone, i.e., mobile station 102, provides multiple types of service, for example, GSM and PCS1900 in the same phone, the mobile station 102 is required to meet the performance criteria at each operational frequency, for example, the 900 MHz of GSM and the 1.9 GHz of PCS1900. The GSM standard refers to the performance that is tested as bad frame indication (BFI), and a bad speech frame that is passed to the vocoder is referred to as an "undetected bad frame". The GSM standard requires, for example, that less than 0.041% of frames passed to the vocoder be undetected bad frames, which corresponds to less than one undetected bad frame per 60 seconds. For example, in DTX mode, frames that contain silence or only background noise may result in bad speech frames that should be prevented from being passed to the vocoder.

In a full rate speech traffic channel (TCH/F or TCH/FS)—such as traffic channel 206—the fact that only 3 bits are used for the CRC error detection means that there is a significant probability that the CRC error detection will pass a bad frame to the vocoder as a correctly received speech frame, i.e., a good frame. For example, when the input to mobile station 102 is purely white noise or randomly modulated data, each bit of the 3-bit CRC has a 50—50 chance, or probability ½, of correctly matching the random data so that the CRC will pass $\frac{1}{2}^3$=12.5% of the random data when none should pass. Because of various technical considerations, for example, that half of the frames may be interpreted as FACCH frames that fail the 40-bit CRC for FACCH, it may be assumed that only 6.25% of the random data will pass CRC, which is unacceptable when compared to the 0.041% required by the GSM standard.

As can be seen, there is a need for bad frame indication for GSM mobile stations that overcomes the limitations of the 3-bit CRC error detection for speech frames by detecting bad frames that have passed the CRC. There is also a need for bad frame indication for GSM mobile stations that prevents passing to the vocoder those frames for which there is no input signal but still pass CRC. Moreover, there is a need for bad frame indication that fails a negligible number of good speech frames when a good signal is being received.

SUMMARY OF THE INVENTION

In one aspect of the present invention, a method for bad frame indication of a speech frame includes steps of: estimating a signal-to-noise ratio of the speech frame; checking a cyclic redundancy code value that indicates whether the speech frame passes or fails a cyclic redundancy code error detection; checking a current receive signal quality metric of the speech frame when the speech frame passes the cyclic redundancy code error detection and the signal-to-noise ratio is above a pre-specified value; checking a previous BFI flag and a previous receive signal quality metric when the current receive signal quality metric is not above a high-threshold and is above a low-threshold; and setting a current BFI flag to indicate whether the speech frame is a bad frame according to the signal-to-noise ratio, the cyclic redundancy code value, the current receive signal quality metric, the previous BFI flag, and the previous receive signal quality metric.

In another aspect of the present invention, a method for bad frame indication of a speech frame for GSM mobile stations includes steps of: estimating a signal-to-noise ratio of the speech frame; checking a cyclic redundancy code value that indicates whether the speech frame passes or fails a cyclic redundancy code error detection; setting a current BFI flag to indicate bad frame when the speech frame fails the cyclic redundancy code error detection; setting the current BFI flag to indicate bad frame when the signal-to-noise ratio is below a pre-specified value of the signal-to-noise ratio; checking a current receive signal quality metric of the speech frame when the speech frame passes the cyclic redundancy code error detection and the signal-to-noise ratio is above the pre-specified value; setting the current BFI flag to indicate good frame when the current receive signal quality metric is above a high-threshold; setting the current BFI flag to indicate bad frame when the current receive signal quality metric is not above a low-threshold; checking a previous BFI flag and a previous receive signal quality metric when the current receive signal quality metric is not above the high-threshold and is above the low-threshold; setting the current BFI flag to indicate good frame when either, or both, the previous BFI flag indicates good frame or the previous receive signal quality metric is above the high threshold; and setting the current BFI flag to indicate bad frame when the previous BFI flag indicates bad frame and the previous receive signal quality metric is not above the high threshold.

In a still further aspect of the present invention, a method for bad frame indication of a speech frame in a GSM mobile station includes: a step for providing a signal-to-noise ratio of the speech frame; a step for evaluating a cyclic redundancy code error detection for the speech frame and providing a cyclic redundancy code value that indicates whether the speech frame passes or fails the cyclic redundancy code error detection; a step for decoding the speech frame into a decoded frame; a step for re-encoding the decoded frame into a re-encoded frame; a step for correlating the speech frame with the re-encoded frame to provide a correlation; a step for using the correlation to provide a current receive signal quality metric; a step for storing a previous BFI flag and a previous receive signal quality metric; a step for providing a comparison of the signal-to-noise ratio to a pre-specified value; a step for comparing the current receive signal quality metric to a high-threshold when the speech frame passes the cyclic redundancy code error detection and the signal-to-noise ratio is above the pre-specified value; a step for comparing the current receive signal quality metric to a low-threshold when the current receive signal quality metric is not above the high-threshold; a step for checking the previous BFI flag and the previous receive signal quality metric when the current receive signal quality metric is not above the high-threshold and is above the low-threshold; and a step for setting a current BFI flag to indicate whether the speech frame is a bad frame or a good frame according to the comparison of the signal-to-noise ratio, the cyclic redundancy code value, the current receive signal quality metric, the previous receive signal quality metric, and the previous BFI flag.

In still another aspect of the present invention, a GSM mobile station that receives a speech frame, includes: means for estimating a signal-to-noise ratio of the speech frame; means for checking a cyclic redundancy code value that indicates whether the speech frame passes or fails a cyclic redundancy code error detection; means for checking a current receive signal quality metric of the speech frame when the speech frame passes the cyclic redundancy code error detection and the signal-to-noise ratio is above a pre-specified value; means for checking a previous BFI flag and a previous receive signal quality metric when the current receive signal quality metric is not above a high-threshold and is above a low-threshold; and means for setting a current BFI flag to indicate whether the speech frame is a bad frame according to the signal-to-noise ratio, the cyclic redundancy code value, the current receive signal quality metric, the previous receive signal quality metric, and the previous BFI flag.

In yet another aspect of the present invention, a mobile station that receives a speech frame, includes: a DSP module that provides a signal-to-noise ratio of the speech frame, evaluates a cyclic redundancy code error detection for the speech frame, provides a cyclic redundancy code value that indicates whether the speech frame passes or fails a cyclic redundancy code error detection, and decodes the speech frame into a decoded frame; an encoder, connected to the DSP module, that receives the decoded frame and re-encodes the decoded frame into a re-encoded frame; a correlator, connected to the encoder, that correlates the speech frame with the re-encoded frame to provide a correlation, and that uses the correlation to provide a current receive signal quality metric; and a BFI module, connected to the DSP module and to the correlator. In operation, the BFI module: stores a previous BFI flag and a previous receive signal quality metric; receives the signal-to-noise ratio and provides a comparison of the signal-to-noise ratio to a pre-specified value; receives the cyclic redundancy code value; receives the current receive signal quality metric and compares the current receive signal quality metric to a high-threshold when the speech frame passes the cyclic redundancy code error detection and the signal-to-noise ratio is above the pre-specified value; compares the current receive signal quality metric to a low-threshold when the current receive signal quality metric is not above the high-threshold; checks the previous BFI flag and the previous receive signal quality metric when the current receive signal quality metric is not above the high-threshold and is above the low-threshold; and sets a current BFI flag to indicate whether the speech frame is a bad frame or good frame according to the comparison of the signal-to-noise ratio, the cyclic redundancy code value, the current receive signal quality metric, the previous receive signal quality metric, and the previous BFI flag.

In a further aspect of the present invention, a GSM system includes a mobile station that receives a speech frame. The mobile station includes: a receiver that demodulates a radio frequency signal to provide the speech frame received by the mobile station; a DSP module that provides a signal-to-noise ratio of the speech frame, evaluates a cyclic redundancy code error detection for the speech frame and provides a cyclic redundancy code value that indicates whether the speech frame passes or fails the cyclic redundancy code error detection, and decodes the speech frame into a decoded frame using a Viterbi decoder; an encoder, connected to the DSP module, that receives the decoded frame and re-encodes the decoded frame into a re-encoded frame; a correlator, connected to the encoder, that correlates the speech frame with the re-encoded frame to provide a correlation, and that uses the correlation to provide a current receive signal quality metric; and a BFI module, connected to the DSP module and to the correlator In operation, the BFI module: stores a previous BFI flag and a previous receive signal quality metric; receives the signal-to-noise ratio and provides a comparison of the signal-to-noise ratio to a pre-specified value; receives the cyclic redundancy code value; sets a current BFI flag to indicate bad frame when the cyclic redundancy code value indicates the speech frame fails the cyclic redundancy code error detection; sets the current BFI flag to indicate bad frame when the signal-to-noise ratio is below the pre-specified value; receives the current receive signal quality metric and, when the speech frame passes the cyclic redundancy code error detection and the signal-to-noise ratio is above the pre-specified value, compares the current receive signal quality metric to a high-threshold corresponding to a first pre-determined value of the correlation; sets the current BFI flag to indicate good frame when the current receive signal quality metric is above the high-threshold; compares, when the current receive signal quality metric is not above the high-threshold, the current receive signal quality metric to a low-threshold corresponding to a second pre-determined value of the correlation; sets the current BFI flag to indicate bad frame when the current receive signal quality metric is not above the low-threshold; checks the previous BFI flag and the previous receive signal quality metric when the current receive signal quality metric is not above the high-threshold and is above the low-threshold; sets the current BFI flag to indicate good frame when the current receive signal quality metric is not above the high-threshold and is above the low-threshold and either, or both, occur that the previous BFI flag indicates good frame or the previous receive signal quality metric is above the high-threshold; and sets the current BFI flag to indicate bad frame when the current receive signal quality metric is not above the high-threshold and is above the low-threshold and the previous BFI flag indicates bad frame and the previous receive signal quality metric is not above the high-threshold.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, one embodiment of the present invention provides a method for bad frame indication for GSM mobile stations that, by detecting bad frames that have passed the CRC error detection, overcomes the limitations of the 3-bit CRC error detection for speech frames specified in the GSM standard. Although, the GSM standard provides a performance level specification for bad frame indication, the standard provides no guidance for meeting the performance level criteria, so that methods and systems for meeting the performance level criteria are typically proprietary. For example, one embodiment of the present invention may provide a novel receive signal quality metric that can be used to aid detection of bad speech frames and to fail, i.e., prevent from reaching the vocoder, the bad speech frames. Also, for example, one embodiment may use an estimate of the signal-to-noise ratio (SNR) of the input signal to aid detection of bad speech frames and to fail the bad speech frames. Thus, in one embodiment, bad frame indication for GSM mobile stations may be provided that prevents frames that pass CRC but for which there is no input signal, i.e., bad SNR, from being passed to the vocoder. Likewise, in one embodiment, bad frame indication may fail a negligible number of frames when a signal with a good SNR is being received.

Figure 3:
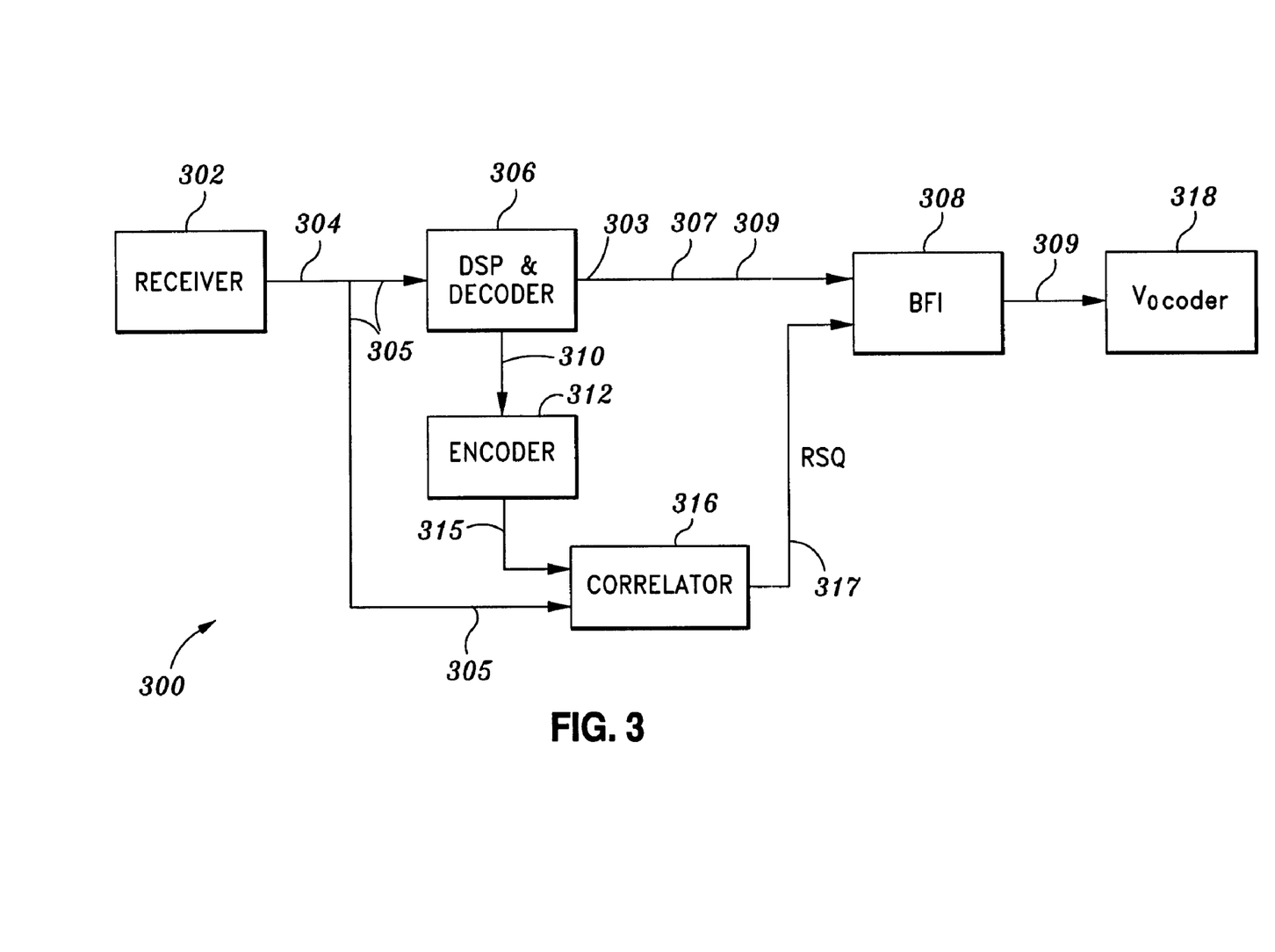
FIG. 3 is a block diagram of an exemplary mobile station for GSM according to an embodiment of the present invention.

Referring now to FIG. 3, an exemplary mobile station 300, in accordance with one embodiment of the present invention, is illustrated. Mobile station 300 may be used, for example, in conjunction with a GSM system such as the GSM network 100 (FIG. 1), where mobile station 300 may be used along with or instead of the mobile station 102. The mobile station 300 may include a receiver 302, which may receive data communications such as the 26-frame multi-frame 208 transmitted via the radio link 106 across the Um interface 112, also referred to as the radio channel 112. Communication may be received as a radio frequency signal which receiver 302 may demodulate. The receiver 302 may also perform functions such as deciphering, burst disassembling, and de-interleaving, as known in the art, and may provide digital data 304 to a DSP module 306 for digital signal processing (DSP) and decoding. The data 304 may be in the form of encoded speech frames 305.

The DSP module 306 may estimate a signal-to-noise ratio (SNR) 307 for the digital data 304 using DSP techniques known in the art, and provide the SNR 307 for an encoded speech frame 305 to a bad frame indication (BFI) module 308. The DSP module 306 may also evaluate a cyclic redundancy code (CRC) error detection for the encoded speech frame 305, thus providing the BFI module 308 with a CRC value 303 of 1, for example, to indicate that the encoded speech frame 305 passes CRC error detection, i.e., CRC error detection detects no error in the encoded speech frame 305. Alternatively, the DSP module 306 may provide the BFI module 308 with a CRC value 303 of 0, for example, to indicate that the encoded speech frame 305 fails CRC error detection, i.e., CRC error detection detects an error in the encoded speech frame 305.

The DSP module 306 may decode the encoded speech frames 305 of digital data 304, for example, using a Viterbi decoder to provide decoded speech frames 309 to the BFI module 308. The SNR 307 and CRC value 303 of a decoded speech frame 309 may be the values of the SNR 307 and the CRC value 303 for the encoded speech frame 305 from which the decoded speech frame 309 is decoded.

DSP module 306 may pass Viterbi input and output 310 of the decoded speech frame 309 to an encoder 312 to be re-encoded by the encoder 312 into re-encoded speech frames 315. The re-encoded speech frames 315 may be passed to a correlator 316.

The correlator 316 may statistically correlate the re-encoded speech frames 315 with the input speech frames 305. Statistical correlation of independent data sources, for example, may range in value from −1.0 to +1.0. The re-encoded speech frames 315 are dependent, however, on the input speech frames 305. Thus, correlation of the re-encoded speech frames 315 with the input speech frames 305 may be likely to range in value, for example, from roughly 0.3 to 1.0. A high correlation, e.g. from 0.854 to 1.0, may indicate a good match in the data between the re-encoded speech frames 315 and the input speech frames 305 and, therefore, can signify few errors in the output 310 of the Viterbi decoder. Conversely, a low correlation, e.g. from 0.3 to 0.824, for example, may indicate a poor match in the data between the re-encoded speech frames 315 and the input speech frames 305 and, therefore, can signify more errors in the output 310 of the Viterbi decoder. Thus, the correlator 316 may use correlation of the re-encoded speech frames 315 with the input speech frames 305 to provide a "receive signal quality" (RSQ) metric 317 that can measure how free of errors a decoded speech frame 309 may be expected to be. The RSQ metric 317 may be expressed, for example, as a 16-bit number corresponding to the value of the correlation between the re-encoded speech frames 315 and the input speech frames 305. The RSQ metric 317 may be passed to the BFI module 308.

The BFI module 308 may then use the SNR 307 of the decoded speech frame 309, the RSQ metric 317 of the decoded speech frame 309, and the CRC value 303 of the decoded speech frame 309, to decide whether or not to pass the decoded speech frame 309 to a vocoder 318. Vocoder 318 may be, for example, a regular pulse excited—linear predictive coder (RPE-LPC) with a long-term predictor loop, as described above.

Figure 4:
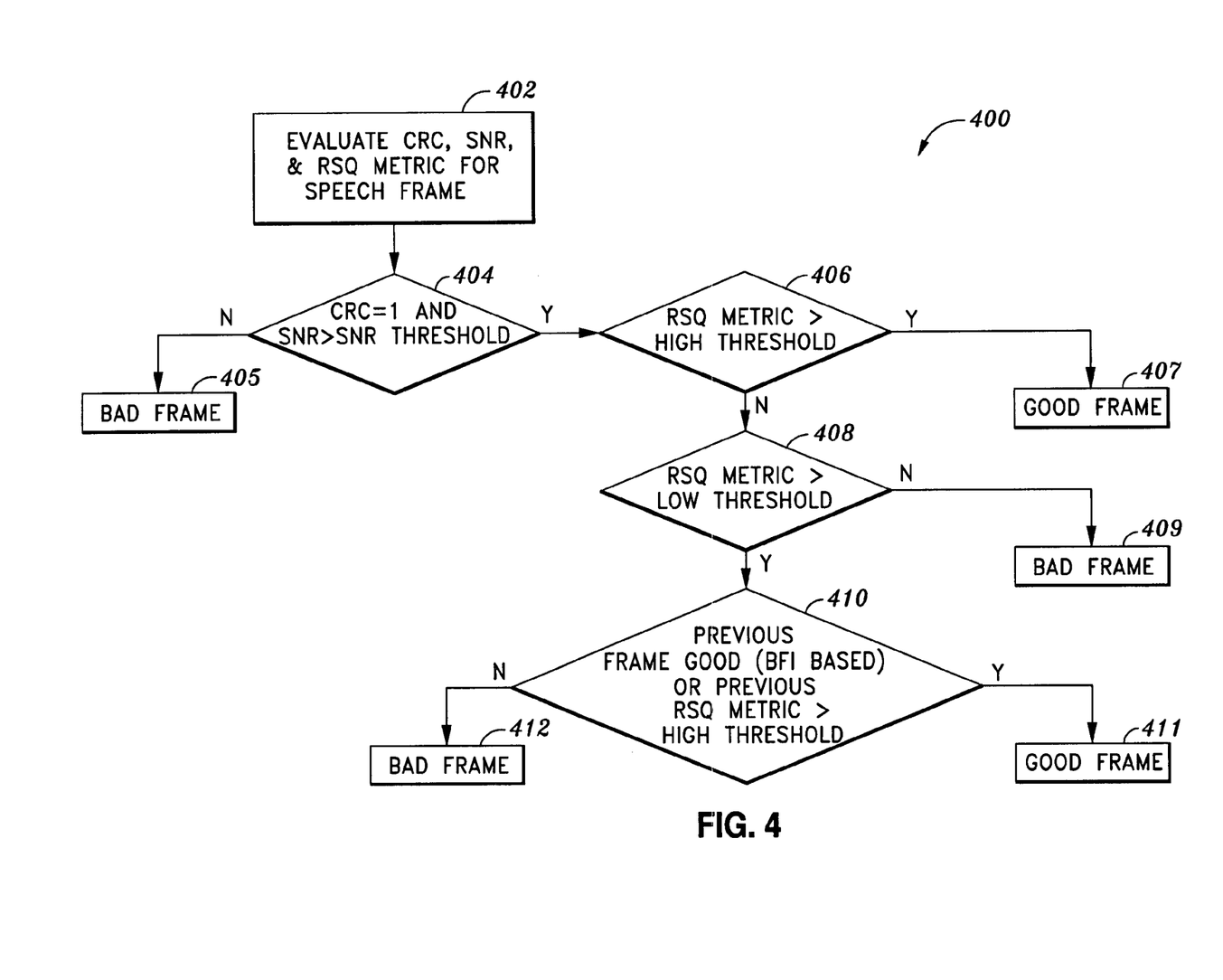
FIG. 4 is a flow chart illustrating a method for bad frame indication in a mobile station for a GSM system, such as shown in FIG. 3, in accordance with one embodiment of the present invention.

In operation, the BFI module 308 may first check the CRC value 303 and the SNR 307 of the decoded speech frame 309 currently under consideration, referred to as the current speech frame 309. If either (or both) the CRC value 303 is 0 (CRC detected an error) or the SNR 307 is below a pre-specified value—which may be measured, for example, in decibels (dB)—then the current speech frame 309 may be indicated to be a bad frame. The pre-specified value for the SNR may also be referred to as the "SNR threshold" as shown in FIG. 4. The pre-specified value may be chosen based on testing (for example, testing shows that a pre-specified value of 0.5 dB may provide a performance level adequate to meet the GSM standard). A pre-specified value greater than 0.5 dB may be chosen to decrease reliance of the bad frame indication on the RSQ metric 317 and, conversely, a pre-specified value less than 0.5 dB, for example, between 0.0 and 0.5 dB, may be chosen to increase reliance of the bad frame indication on the RSQ metric 317. When the current frame 309 is indicated to be a bad frame, a current BFI flag, for example, a register or a bit in a register of BFI module 308, may be set to indicate bad frame, i.e., that current speech frame 309 is a bad frame, and the current speech frame 309 may be discarded and not passed to the vocoder 318. When the current speech frame 309 is discarded, the most recent previous speech frame 309 that has been indicated to be a good frame may be passed to the vocoder 318 instead.

In the alternative, if neither condition applies, that is, if both the CRC value 303 is 1 (CRC did not detect an error) and the SNR 307 is above the pre-specified value, then the BFI module 308 may subsequently check the RSQ metric 317 of the current speech frame 309.

If the RSQ metric 317 is above a pre-determined high-threshold which may be chosen based on testing (for example, testing shows that a pre-determined high-threshold corresponding to a correlation of 0.854 may provide a performance level adequate to meet the GSM standard), then the current speech frame 309 may be indicated to be a good frame. For example, a current BFI flag of BFI module 308 may be set to indicate good frame, and the current speech frame 309 may then be passed to the vocoder 318.

If, on the other hand, the RSQ metric 317 is not above a pre-determined low-threshold which may be chosen based on testing (for example, testing shows that a pre-determined high-threshold corresponding to a correlation of 0.824 may provide a performance level adequate to meet the GSM standard), then the current speech frame 309 may be indicated to be a bad frame. A current BFI flag of BFI module 308 may then be set to indicate a bad frame, and the current speech frame 309 may be discarded and not passed to the vocoder 318.

If, conversely, the RSQ metric 317 is not above the pre-determined high-threshold but is above the pre-determined low-threshold (for example, between a correlation of 0.854 and one of 0.824), the BFI module 308 may then check the previous speech frame 309, i.e., the speech frame 309 corresponding to the 20 ms speech sample immediately preceding (in time) the 20 ms speech sample corresponding to the current speech frame 309.

If the previous BFI flag for the previous speech frame 309 indicates a good frame or the previous RSQ metric 317, i.e., the RSQ metric 317 evaluated for the previous speech frame 309, was above the pre-determined high-threshold, then the current speech frame 309 may be indicated to be a good frame. A current BFI flag of the BFI module 308 may then be set to indicate a good frame, and the current speech frame 309 may be passed to the vocoder 318. If the previous BFI flag for the previous speech frame 309 indicates a bad frame and the previous RSQ metric 317 was not above the pre-determined high-threshold, then the current speech frame 309 may be indicated to be a bad frame. A current BFI flag of the BFI module 308 may then be set to indicate a bad frame, and the current speech frame 309 may be discarded and not passed to the vocoder 318.

Referring now to FIG. 4, an exemplary embodiment of a method 400 for bad frame indication in a mobile station for a GSM system, such as the mobile station 300 shown in FIG. 3, is illustrated. Method 400 may be implemented, for example, in hardware—such as a processor—of the mobile station 300. Method 400 may also be implemented, for example, in software loaded in a memory in the mobile station 300.

The exemplary method 400 may include steps 402, 404, 405, 406, 407, 408, 409, 410, 411, and 412, which delineate the method 400 for purposes of convenient illustration according to one embodiment. The exemplary method 400 is illustrated with reference to the mobile station 300 shown in FIG. 3.

The method 400 may begin with a step 402, in which CRC error detection may be evaluated for an input speech frame, SNR may be estimated for the input speech frame, and a receive signal quality metric may be calculated for the input speech frame. For example, the CRC value 303 and the SNR 307 may be provided by the DSP module 306, and the RSQ metric 317 may be provided by the correlator 316 for a current speech frame 309, as described above.

The method 400 may continue at a step 404, in which a decision may be made based on the CRC error detection and the SNR of the input speech frame. For example, a processor may first check the CRC value 303 and the SNR 307 of the current speech frame 309. If either the CRC value 303 is 0 or the SNR 307 is below a pre-specified value, referred to as the "SNR threshold", (for example, 0.5 dB), then the current speech frame 309 may be indicated to be a bad frame. A current BFI flag may thus be set by the processor at a step 405 to indicate a bad frame, and the current speech frame 309 may be discarded and not passed to the vocoder 318. If both the CRC value 303 is 1 and the SNR 307 is above the pre-specified value of the SNR threshold (for example, 0.5 decibels), then the method 400 may continue at a step 406.

At the step 406, the receive signal quality metric may be checked before deciding whether the input speech frame is good or bad. For example, a processor may check the RSQ metric 317 of current speech frame 309. If RSQ metric 317 is above a pre-determined high-threshold (for example, corresponding to a correlation of 0.854), then the current speech frame 309 may be indicated to be a good frame. A current BFI flag may thus be set by the processor at a step 407 to indicate a good frame, and the current speech frame 309 may be passed to the vocoder 318. If the RSQ metric 317 is not above a pre-determined high-threshold (for example, corresponding to a correlation of 0.854), then the method 400 may continue at a step 408.

At the step 408, the receive signal quality metric may be checked against additional criteria before deciding whether the input speech frame is good or bad. For example, if the RSQ metric 317 is not above a pre-determined low-threshold (for example, corresponding to a correlation of 0.824), then the current speech frame 309 may be indicated to be a bad frame. A current BFI flag may thus be set by the processor at a step 409 to indicate a bad frame, and the current speech frame 309 may be discarded and not passed to vocoder 318. Conversely if the RSQ metric 317 is above the pre-determined low-threshold, so that for example, the RSQ metric 317 corresponds to a correlation between 0.824 and 0.854, then the method 400 may continue at a step 410.

At the step 410, the previous speech frame, for example, the previous speech frame 309, may be checked before deciding whether the current input speech frame is good or bad. If the previous BFI flag for the previous frame 309 indicates a good frame or the previous RSQ metric 317 for the previous frame 309 was above the pre-determined high-threshold value, then the current speech frame 309 may be indicated to be a good frame. A current BFI flag may then be set by the processor at a step 411 to indicate a good frame, and the current speech frame 309 may be passed to the vocoder 318. If the previous BFI flag for the previous frame 309 indicates a bad frame and the previous RSQ metric 317 was not above the pre-determined high-threshold, then the current speech frame 309 may be indicated to be a bad frame. A current BFI flag may then be set by the processor at a step 412 to indicate a bad frame, and the current speech frame 309 may be discarded and not passed to vocoder 318.

It should be understood, of course, that the foregoing relates to preferred embodiments of the invention and that modifications may be made without departing from the spirit and scope of the invention as set forth in the following claims.

We claim:

1. A method for bad frame indication of a current speech frame, comprising steps of:
   estimating a signal-to-noise ratio of the speech frame;
   checking a cyclic redundancy code value that indicates whether the speech frame passes or fails a cyclic redundancy code error detection;
   checking a current receive signal quality metric of the speech frame when the speech frame passes said cyclic redundancy code error detection and said signal-to-noise ratio is above a pre-specified value;
   when said current receive signal quality metric either is above a high-threshold or is not above a low-threshold:
      performing a calculation on the current speech frame by setting a current BFI flag to indicate whether the speech frame is a bad frame according to said signal-to-noise ratio, said cyclic redundancy code value, and said current receive signal quality metric;
   when said current receive signal quality metric is not above said high-threshold and is above said low-threshold:
      varying said calculation on the current speech frame to use the previous BFI flag and previous receive signal quality metric of a previous calculation for a previous speech frame by:
      checking a previous BFI flag and a previous receive signal quality metric; and
      setting said current BFI flag to indicate whether the speech frame is a bad frame according to said previous BFI flag and said previous receive signal quality metric.

2. The method of claim 1, further comprising steps of:
   setting said current BFI flag to indicate bad frame when the speech frame fails said cyclic redundancy code error detection;
   setting said current BFI flag to indicate bad frame when said signal-to-noise ratio is below said pre-specified value;
   setting said current BFI flag to indicate good frame when said current receive signal quality metric is above said high-threshold;
   setting said current BFI flag to indicate bad frame when said current receive signal quality metric is not above said low-threshold;
   setting said current BFI flag to indicate good frame when said current receive signal quality metric is not above said high-threshold and is above said low-threshold and either, or both, occur that said previous BFI flag indicates good frame or said previous receive signal quality metric is above said high-threshold; and
   setting said current BFI flag to indicate bad frame when said current receive signal quality metric is not above said high-threshold and is above said low-threshold and said previous BFI flag indicates bad frame and said previous receive signal quality metric is not above said high-threshold.

3. The method of claim 1, further comprising a step of:
   providing said current receive signal quality metric using Viterbi decoding of the speech frame.

4. The method of claim 1, further comprising steps of:
   decoding the speech frame into a decoded frame;
   re-encoding the decoded frame into a re-encoded frame;
   correlating the speech frame with said re-encoded frame to provide a correlation; and
   using said correlation to provide said current receive signal quality metric.

5. The method of claim 4, wherein said high-threshold corresponds to a value of said correlation.

6. The method of claim 4, wherein said low-threshold corresponds to a value of said correlation.

7. The method of claim 1, further comprising a step of estimating said signal-to-noise ratio.

8. The method of claim 1, further comprising a step of:
   evaluating said cyclic redundancy code error detection for the speech frame and providing to said step of checking said cyclic redundancy code value said cyclic redundancy code value that indicates whether the speech frame passes or fans said cyclic redundancy code error detection.

9. A method for bad frame indication of a current speech frame in a GSM mobile station, comprising steps of:
estimating a signal-to-noise ratio of the speech frame;
checking a cyclic redundancy code value that indicates whether the speech frame passes or fails a cyclic redundancy code error detection;
setting a current BFI flag to indicate bad frame when the speech frame fails said cyclic redundancy code error detection;
setting said current BFI flag to indicate bad frame when said signal-to-noise ratio is below a pre-specified value of said signal-to-noise ratio;
checking a current receive signal quality metric of the speech frame when the speech frame passes said cyclic redundancy code error detection and said signal-to-noise ratio is above said pre-specified value;
setting said current BFI flag to indicate good frame when said current receive signal quality metric is above a high-threshold;
setting said current BFI flag to indicate bad frame when said current receive signal quality metric is not above a low-threshold; and
varying a calculation of the current frame conditionally on an outcome of a calculation for a previous frame, when said current receive signal quality metric is not above said high-threshold and is above said low-threshold, by adding the steps of:
  checking a previous BFI flag and a previous receive signal quality metric;
  setting said current BFI flag to indicate good frame when either or both occur that said previous BFI flag indicates good frame or said previous receive signal quality metric is above said high-threshold; and
  setting said current BFI flag to indicate bad frame when said previous BFI flag indicates bad frame and said previous receive signal quality metric is not above said high-threshold.

10. The method of claim 9, further comprising steps of:
decoding the speech frame using a Viterbi decoder to provide a decoded frame;
re-encoding the decoded frame into a re-encoded frame; and
correlating the speech frame with said re-encoded frame to provide a correlation, said receive signal quality metric being equal to said correlation.

11. The method of claim 10, wherein said receive signal quality metric is compared to a high-threshold value of said correlation.

12. The method of claim 10, wherein said receive quality signal metric is compared to a low-threshold value of said correlation.

13. The method of claim 9, further comprising a step of estimating said signal-to-noise ratio using a digital signal processor.

14. The method of claim 9, further comprising a step of:
evaluating said cyclic redundancy code error detection for the speech frame and providing said cyclic redundancy code value equal to a first value when the speech frame passes said cyclic redundancy code error detection and providing said cyclic redundancy code value equal to a second value when the speech frame fails said cyclic redundancy code error detection.

15. A method for bad frame indication of a speech frame in a GSM mobile station, comprising:

a step for providing a signal-to-noise ratio of the speech frame;
a step for evaluating a cyclic redundancy code error detection for the speech frame and providing a cyclic redundancy code value that indicates whether the speech frame passes or fails said cyclic redundancy code error detection;
a step for decoding the speech frame into a decoded frame;
a step for re-encoding said decoded frame into a re-encoded frame;
a step for correlating the speech frame with said re-encoded frame to provide a correlation;
a step for using said correlation to provide a current receive signal quality metric;
a step for storing a previous BFI flag and a previous receive signal quality metric;
a step for providing a comparison of said signal-to-noise ratio to a pre-specified value;
a step for comparing said current receive signal quality metric to a high-threshold when the speech frame passes said cyclic redundancy code error detection and said signal-to-noise ratio is above said pre-specified value;
a step for comparing said current receive signal quality metric to a low-threshold when said current receive signal quality metric is not above said high-threshold;
a step for varying a frame calculation for the speech frame using an outcome of a previous speech frame calculation of said previous BFI flag and said previous receive signal quality metric, including:
  when said current receive signal quality metric either is above said high-threshold or is not above said low-threshold,
    a step for setting a current BFI flag indicate whether the speech frame is a bad frame or a good frame according to said comparison of said signal-to-noise ratio, said cyclic redundancy code value, said current receive signal quality metric, and
  when said current receive signal quality metric is not above said high-threshold and is above said low-threshold,
    a step for checking said previous BFI flag and said previous receive signal quality metric; and
    a step for setting said current BFI flag to indicate whether the speech frame is a bad frame or a good frame according to said previous receive signal quality metric,and said previous BFI flag.

16. The method of claim 15, wherein said step for providing a comparison of said signal-to-noise ratio to a pre-specified value includes:
a step for setting said current BFI flag to indicate bad frame when said cyclic redundancy code value indicates the speech frame fails said cyclic redundancy code error detection; and
a step for setting said current BFI flag to indicate bad frame when said signal-to-noise ratio is below said pit-specified value.

17. The method of claim 15, wherein said step for comparing said receive signal quality metric to a high-threshold includes:
a step for setting said current BFI flag to indicate good frame when said receive signal quality metric is above said high-threshold.

18. The method of claim 15, wherein said step for comparing said receive signal quality metric to a low-threshold includes:

a step for setting said current BFI flag to indicate bad frame when said receive signal quality metric is not above said low-threshold.

19. The method of claim 15, wherein said step for checking said previous BFI flag and said previous receive signal quality metric includes:
   a step for setting said current BFI flag to indicate good frame when said receive signal quality metric is not above said high-threshold and is above said low-threshold and either, or both, occur that said previous BFI flag indicates good frame or said previous receive signal quality metric is above said high-threshold; and
   a step for setting said current BFI flag to indicate bad frame when said receive signal quality metric is not above said high-threshold and is above said low-threshold and said previous BFI flag indicates bad frame and said previous receive signal quality metric is not above said high-threshold.

20. The method of claim 15, wherein said step for using said correlation to provide a receive signal quality metric includes:
   corresponding said receive signal quality metric to said correlation;
   setting said high-threshold to correspond to a value of said correlation; and
   setting said low-threshold to correspond to a value of said correlation.

21. A GSM mobile station that receives a current speech frame, comprising:
   means for estimating a signal-to-noise ratio of the current speech frame;
   means for checking a cyclic redundancy code value that indicates whether the current speech frame passes or fails a cyclic redundancy code error detection;
   means for checking a current receive signal quality metric of the current speech frame when the current speech frame passes said cyclic redundancy code error detection and said signal-to-noise ratio is above a pre-specified value;
   means for setting a current BFI flag to indicate whether the current speech frame is a bad frame according to said signal-to-noise ratio, said cyclic redundancy code value, and said current receive signal quality metric when said current receive signal quality metric either is above a high-threshold or is not above a low-threshold;
   means for conditionally using an outcome of a calculation for a previous speech frame, said outcome including a previous BFI flag and a previous receive signal quality metric, by checking said previous BFI flag and said previous receive signal quality metric when said current receive signal quality metric is not above a high-threshold and is above a low-threshold and setting said current BFI flag to indicate whether the current speech frame is a bad frame according to said previous receive signal quality metric, and said previous BFI flag.

22. The GSM mobile station of claim 21, further comprising:
   means for setting said current BFI flag to indicate bad frame when the speech frame fails said cyclic redundancy code error detection;
   means for setting said current BFI flag to indicate bad frame when said signal-to-noise ratio is below said pre-specified value; and
   means for discarding the speech frame when said current BFI flag is set to indicate bad frame.

23. The GSM mobile station of claim 21, further comprising:
   means for setting said current BFI flag to indicate good frame when said receive signal quality metric is above said high-threshold;
   means for setting said current BFI flag to indicate bad frame when said receive signal quality metric is not above said low-threshold.

24. The GSM mobile station of claim 21, further comprising:
   means for setting said current BFI flag to indicate good frame when said receive signal quality metric is not above said high-threshold and is above said low-threshold and either, or both, occur that said previous BFI flag indicates good frame or said previous receive signal quality metric is above said high-threshold;
   means for setting said current BFI flag to indicate bad frame when said receive signal quality metric is not above said high-threshold and is above said low-threshold and said previous BFI flag indicates bad frame and said previous receive signal quality metric is not above said high-threshold.

25. The GSM mobile station of claim 21, wherein said means for checking a receive signal quality metric further comprises:
   means for Viterbi decoding the speech frame into a decoded frame;
   means for re-encoding the decoded frame into a re-encoded frame;
   means for correlating the speech frame with said re-encoded frame to provide a correlation; and
   means for corresponding said correlation to said receive signal quality metric, corresponding said high-threshold to a first value of said correlation, and corresponding said low-threshold to a second value of said correlation.

26. A mobile station that receives a speech frame, comprising:
   a DSP module that provides a signal-to-noise ratio of the speech frame, evaluates a cyclic redundancy code error detection for the speech frame, provides a cyclic redundancy code value that indicates whether the speech frame passes or fails said cyclic redundancy code error detection, and decodes the speech frame into a decoded frame;
   an encoder, connected to said DSP module, that receives said decoded frame and re-encodes said decoded frame into a re-encoded frame;
   a correlator, connected to said encoder, that correlates the speech frame with said re-encoded frame to provide a correlation, and that uses said correlation to provide a current receive signal quality metric; and a BFI module, connected to said DSP module and to said correlator, wherein said BFI module:
   stores a previous BFI flag and a previous receive signal quality metric;
   receives said signal-to-noise ratio and provides a comparison of said signal-to-noise ratio to a pre-specified value;
   receives said cyclic redundancy code value;
   receives said current receive signal quality metric and compares said current receive signal quality metric to a high-threshold when the speech frame passes said cyclic redundancy code error detection and said signal-to-noise ratio is above said pre-specified value;
   compares said current receive signal quality metric to a low-threshold when said current receive signal quality metric is not above said high-threshold;

performs a frame calculation, when said current receive signal quality metric either is above said high-threshold or is not above said low-threshold, wherein said BFI module:
  sets a current BFI flag to indicate whether the speech frame is a bad frame or good frame according to said comparison of said signal-to-noise ratio, said cyclic redundancy code value, and said current receive signal quality metric;
varies said frame calculation, when said current receive signal quality metric is not above said high-threshold and is above said low-threshold, for the speech frame using an outcome of a previous frame calculation of said previous BFI flag and said previous receive signal quality metric, wherein said BFI module:
  checks said previous BFI flag and said previous receive signal quality metric; and
  sets said current BFI flag to indicate whether the speech frame is a bad frame or good frame according to said previous receive signal quality metric, and said previous BFI flag.

27. The mobile station of claim 26, wherein said BFI module:
  sets said current BFI flag to indicate bad frame when said cyclic redundancy code value indicates the speech frame fails said cyclic redundancy code error detection;
  sets said current BFI flag to indicate bad frame when said signal-to-noise ratio is below said pre-specified value;
  sets said current BFI flag to indicate good frame when said receive signal quality metric is above said high-threshold;
  sets said current BFI flag to indicate bad frame when said receive signal quality metric is not above said low-threshold;
  sets said current BFI flag to indicate good frame when said receive signal quality metric is not above said high-threshold and is above said low-threshold and either, or both, occur that said previous BFI flag indicates good frame or said previous receive signal quality metric is above said high-threshold; and
  sets said current BFI flag to indicate bad frame when said receive signal quality metric is not above said high-threshold and is above said low-threshold and said previous BFI flag indicates bad frame and said previous receive signal quality metric is not above said high-threshold.

28. The mobile station of claim 26, further comprising a Viterbi decoder that provides said decoded frame to said encoder.

29. The mobile station of claim 26, wherein said high-threshold corresponds to a pre-determined value of said correlation.

30. The mobile station of claim 26, wherein said low-threshold corresponds to a pre-determined value of said correlation.

31. A GSM system including a mobile station that receives a speech frame, said mobile station comprising:
  a receiver that demodulates a radio frequency signal to provide the speech frame received by said mobile station;
  a DSP module that provides a signal-to-noise ratio of the speech frame, evaluates a cyclic redundancy code error detection for the speech frame and provides a cyclic redundancy code value that indicates whether the speech frame passes or fails said cyclic redundancy code error detection, and decodes the speech frame into a decoded frame using a Viterbi decoder;
  an encoder, connected to said DSP module, that receives said decoded frame and re-encodes said decoded frame into a re-encoded frame;
  a correlator, connected to said encoder, that correlates the speech frame with said re-encoded frame to provide a correlation, and that uses said correlation to provide a current receive signal quality metric;
  a BFI module, connected to said DSP module and to said correlator, wherein said BFI module:
  stores a previous BFI flag and a previous receive signal quality metric;
  receives said signal-to-noise ratio and provides a comparison of said signal-to-noise ratio to a pre-specified value;
  receives said cyclic redundancy code value;
  sets a current BFI flag to indicate bad frame when said cyclic redundancy code value indicates the speech frame fails said cyclic redundancy code error detection;
  sets said current BFI flag to indicate bad frame when said signal-to-noise ratio is below said pre-specified value;
  receives said current receive signal quality metric and, when the speech frame passes said cyclic redundancy code error detection and said signal-to-noise ratio is above said pre-specified value, compares said current receive signal quality metric to a high-threshold corresponding to a first pre-determined value of said correlation;
  sets said current BFI flag to indicate good frame when said current receive signal quality metric is above said high-threshold;
  compares, when said current receive signal quality metric is not above said high-threshold, said current receive signal quality metric to a low-threshold corresponding to a second pre-determined value of said correlation;
  sets said current BFI flag to indicate bad frame when said current receive signal quality metric is not above said low-threshold;
  varies, when said current receive signal quality metric is not above said high-threshold and is above said low-threshold, a calculation for said speech frame of said current BFI flag conditionally on an outcome of a calculation for a previous speech frame of a previous BFI flag and a previous receive signal quality metric, wherein said BFI module:
  checks said previous BFI flag and said previous receive signal quality metric;
  sets said current BFI flag to indicate good frame when either, or both, occur that said previous BFI flag indicates good frame or said previous receive signal quality metric is above said high-threshold;
  sets said current BFI flag to indicate bad frame when said previous BFI flag indicates bad frame and said previous receive signal quality metric is not above said high-threshold.

* * * * *